(12) United States Patent
Poole et al.

(10) Patent No.: US 9,235,781 B2
(45) Date of Patent: Jan. 12, 2016

(54) METHOD OF, AND APPARATUS FOR, LANDMARK LOCATION

(71) Applicants: KABUSHIKI KAISHA TOSHIBA, Minato-ku (JP); Toshiba Medical Systems Corporation, Otawara-shi (JP)

(72) Inventors: Ian Poole, Edinburgh (GB); Mohammad Dabbah, Edinburgh (GB)

(73) Assignees: KABUSHIKI KAISHA TOSHIBA, Minato-ku (JP); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 28 days.

(21) Appl. No.: 13/963,471

(22) Filed: Aug. 9, 2013

(65) Prior Publication Data
US 2015/0043772 A1    Feb. 12, 2015

(51) Int. Cl.
    G06K 9/00    (2006.01)
    G06K 9/62    (2006.01)
    G06K 9/68    (2006.01)
    G06T 7/00    (2006.01)

(52) U.S. Cl.
    CPC ............ *G06K 9/6227* (2013.01); *G06K 9/628* (2013.01); *G06T 7/0042* (2013.01); *G06T 2207/10081* (2013.01); *G06T 2207/20076* (2013.01); *G06T 2207/20081* (2013.01); *G06T 2207/30004* (2013.01)

(58) Field of Classification Search
    USPC .................................. 382/128–134, 224–228
    See application file for complete search history.

(56) References Cited

U.S. PATENT DOCUMENTS

| 6,597,800 | B1 * | 7/2003 | Murray et al. ................ 382/103 |
| 7,562,057 | B2 * | 7/2009 | Maggioni et al. ............... 706/20 |
| 7,903,857 | B2 | 3/2011 | Huang et al. |
| 8,126,242 | B2 | 2/2012 | Brett et al. |
| 8,290,253 | B1 * | 10/2012 | Wang et al. ................... 382/162 |
| 8,326,006 | B2 | 12/2012 | Suri et al. |
| 8,358,691 | B1 * | 1/2013 | Wang et al. .............. 375/240.02 |

(Continued)

FOREIGN PATENT DOCUMENTS

| JP | 06-296606 A | 10/1994 |
| JP | 2007-283108 A | 11/2007 |
| JP | 2008-505704 A | 2/2008 |
| JP | 2009-153829 A | 7/2009 |
| JP | 2010-515557 A | 5/2010 |

OTHER PUBLICATIONS

Antonio Criminisi, et al., "Decision Forests with Long-Range Spatial Context for Organ Localization in CT Volumes" Microsoft Research, 2009, 13 Pages.

(Continued)

*Primary Examiner* — Alex Liew
(74) *Attorney, Agent, or Firm* — Oblon, McClelland, Maier & Neustadt, L.L.P.

(57) ABSTRACT

An apparatus for locating a landmark in a set of image data comprises a landmark location unit that is configured, for each of a plurality of image data items, to obtain from a first two-class classifier a first classification of the image data item as foreground or background, to obtain from a second two-class classifier a second classification of the image data item as foreground or background, and to combine the first classification and the second classification to obtain a combined classification, and wherein the landmark location unit is further configured to use the combined classifications for the plurality of image data items to determine a location for the landmark.

22 Claims, 8 Drawing Sheets

(56) References Cited

U.S. PATENT DOCUMENTS

| | | | |
|---|---|---|---|
| 2003/0228034 A1* | 12/2003 | Fox et al. | 382/106 |
| 2004/0066966 A1* | 4/2004 | Schneiderman | 382/159 |
| 2006/0088207 A1* | 4/2006 | Schneiderman | 382/159 |
| 2007/0019863 A1* | 1/2007 | Ito | 382/190 |
| 2008/0063263 A1* | 3/2008 | Zhang | G06K 9/00234 382/159 |
| 2008/0219558 A1* | 9/2008 | Lu et al. | 382/190 |
| 2010/0046830 A1* | 2/2010 | Wang et al. | 382/164 |
| 2010/0158356 A1* | 6/2010 | Ranzato et al. | 382/159 |
| 2011/0007366 A1* | 1/2011 | Sarkar et al. | 358/462 |
| 2012/0106837 A1* | 5/2012 | Partis et al. | 382/165 |

OTHER PUBLICATIONS

E. Konukoglu, et al., "Robust Linear Registration of CT Images using Random Regression Forests" Microsoft Research in SPIE Medical Imaging, Feb. 2011, 9 Pages.

Dikmen Mert, et al. "Joint detection and localization of multiple anatomical landmarks through learning" Medical Imaging, Proceedings of SPIE, vol. 6915, No. 1, Apr. 2008, 10 Pages.

* cited by examiner

METHOD OF, AND APPARATUS FOR, LANDMARK LOCATION

FIELD OF THE INVENTION

Embodiments described herein relate generally to a method of, and apparatus for, locating a landmark in a set of image data using classifiers, and a method of, and apparatus for, training classifiers. Embodiments have particular application to locating anatomical landmarks in medical image data.

BACKGROUND

Anatomical landmarks are recognizable points within the body's structure. In medical imaging, anatomical landmarks may be used as reference points, for example to align or register related images. FIG. 1 illustrates a number of anatomical landmarks within the human body by way of example.

Accuracy of anatomical landmark location is important. For example, to use vascular landmarks as seeds for vessel tracking, accuracy of 5 mm or better may be required. It is necessary for a method of landmark location to be capable of dealing with the variations in anatomy resulting from different patients and different views.

There are various known methods for identifying landmarks. For example, identification of landmarks may be carried out manually, by an operator, but this is a lengthy process and results may vary between operators.

Alternatively, identification of landmarks may be performed automatically using classifiers. A classifier usually comprises an algorithm that allocates data items (in this context, points within an image) to categories (classes). A two-class classifier decides whether a point or points should be allocated to a first class or a second class. A multi-class classifier decides to which of a greater number of classes a point or points should be assigned.

A classifier is usually trained on multiple image data sets for each of which the location of the anatomical landmarks of interest is known. A probabilistic classifier outputs a likelihood or probability of a given point being in a particular class.

It is known to use multi-class classifiers to identify a plurality of anatomical landmarks within an image data set during a single procedure. Such multi-class classifiers are able to assign probabilities, for each point and for each landmark, that the point is within a region that contains the landmark (also referred to as a foreground region for that landmark, or a landmark region) or that the point is within a region that does not contain the landmark (also referred to as a background region). By then comparing the resulting probabilities for each point, the most likely position of each landmark can be selected.

However, the use of such multi-class classifiers can be inaccurate. Training the multiclass classifier usually requires selection of foreground and background regions for each landmark within the training data sets. As the background regions are usually much larger than the foreground regions, and as the number of background points and foreground points selected for training purposes may be similar, it can be the case that a relatively small number of background training points may have to be used to represent a large, diverse background region, leading to inaccuracy.

FIG. 2(a) illustrates foreground points 50 and background points 52 that may be used to train a single-stage (rather than nested) classifier. Points on or near the landmark (foreground points 50) are depicted with circles, and points that are not near the landmark (background points 52) are depicted with triangles. The classifier must be trained to distinguish foreground points from background points. If the classifier is probabilistic, it must be trained to output a probability or likelihood that a given point is foreground or background.

One approach to location of multiple landmarks is to train one multi-class classifier. For example, if three landmarks were to be located, a four-class classifier may be trained, with three landmark classes and one background class. Each landmark class would comprise points in the foreground of a respective landmark. This scenario is represented in FIG. 2(b), which shows background points 52 (triangles), first landmark foreground points 50 (circles), second landmark foreground points 54 (squares) and third landmark foreground points 56 (circles).

However, attempting to learn multiple landmarks simultaneously may require a complex decision surface. In order to achieve better accuracy, the foreground points for each landmark may be restricted to a small region around the landmark, resulting in a small number of training points. This may require that the number of background training points is similarly limited, if a classifier training method should require approximately equal numbers of samples from each of the classes. The small number of background training points may have to represent a huge variation in background voxels.

BRIEF DESCRIPTION OF THE DRAWINGS

Embodiments are now described, by way of non-limiting example, and are illustrated in the following figures in which.

DETAILED DESCRIPTION

Certain embodiments provide an apparatus for locating a landmark in a set of image data, the apparatus comprising a landmark location unit that is configured, for each of a plurality of image data items, to obtain from a first two-class classifier a first classification of the image data item as foreground or background, to obtain from a second two-class classifier a second classification of the image data item as foreground or background, and to combine the first classification and the second classification to obtain a combined classification, and wherein the landmark location unit is further configured to use the combined classifications for the plurality of image data items to determine a location for the landmark.

Certain embodiments provide an apparatus for training classifiers for locating a landmark in a set of image data, comprising a classifier training unit configured to receive a plurality of training sets of image data and to train both a first two-class classifier and a second two-class classifier on the plurality of training sets. Each training set contains the landmark and for each training set the location of the landmark in the training set is known. For each of the first and second classifiers, the classifier training unit is configured to train that classifier by determining a respective foreground region containing the landmark and a respective background region, and training the classifier to distinguish between image data items in the respective foreground region and image data items in the respective background region. The foreground region for the second classifier is inside the foreground region for the first classifier, such that the second classifier is trained for locating the landmark to within a smaller foreground region than the first classifier.

Figure 3:
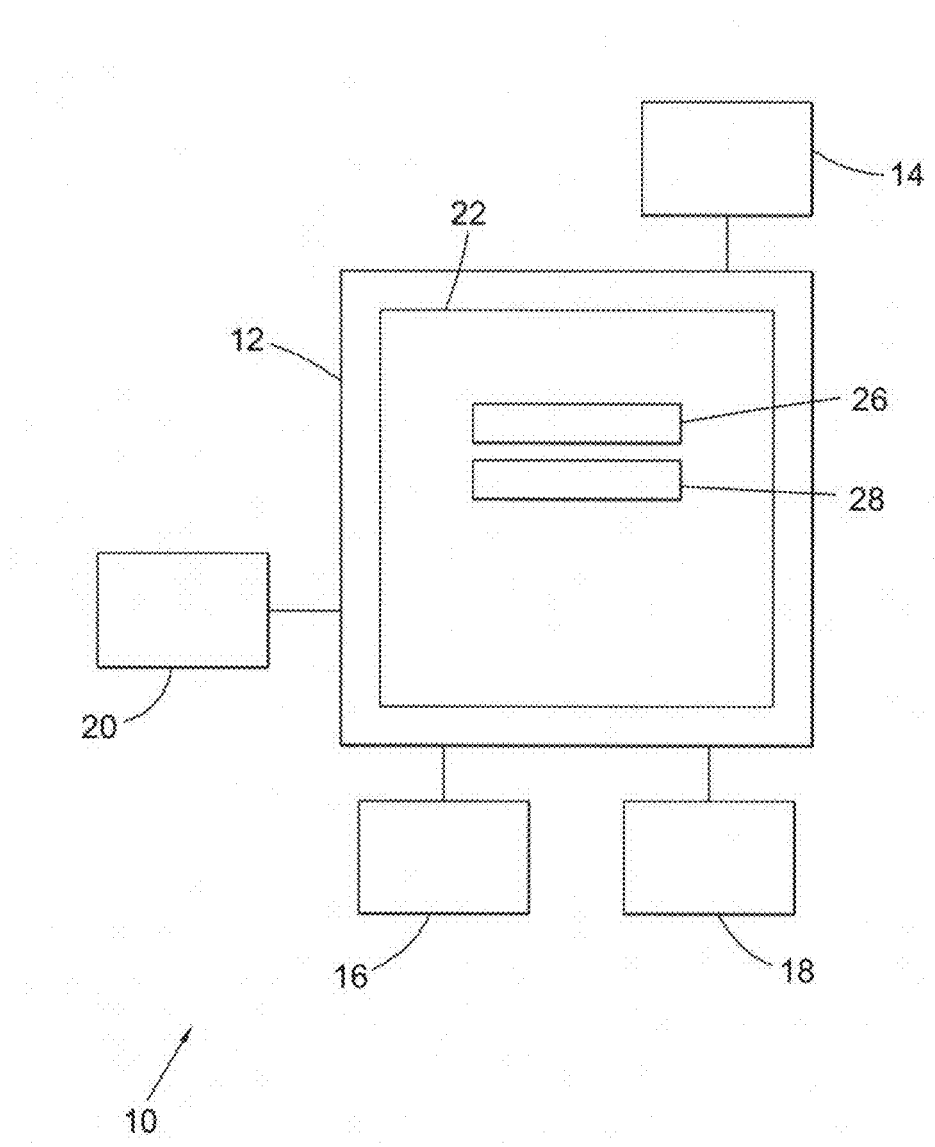
FIG. 3 is a schematic diagram of an image processing system according to an embodiment.

An apparatus according to a first embodiment, which is configured to train classifiers for locating a landmark in a set of image data and to use the classifiers to located the landmark in a set of image data, is illustrated schematically in FIG. 3.

The apparatus 10 comprises a processing apparatus 12, in this case a personal computer (PC) or workstation, that is connected to a CT scanner 14, a display screen 16 and an input device or devices 18, such as a computer keyboard and mouse. In this embodiment, the CT scanner is one of the Toshiba Aquilion range of CT scanners, although in alternative embodiments any suitable scanner may be used. In alternative embodiments, the CT scanner is replaced or supplemented by any scanner that is appropriate for acquiring two-dimensional or three-dimensional medical images, for example an MRI scanner or an ultrasound scanner.

In this embodiment, sets of image data obtained by the CT scanner 14 are stored in memory unit 20 and subsequently provided to the processing unit 12. In an alternative embodiment, sets of image data are supplied from a remote data store (not shown) which may form part of a Picture Archiving and Communication System (PACS). The memory unit 20 or remote data store may comprise any suitable form of memory storage. The memory unit 20 or remote data store may store sets of image data in which points have been manually marked, which may be referred to as training data.

The processing apparatus 12 provides a processing resource for automatically or semi-automatically processing sets of image data. It comprises a central processing unit (CPU) 22 that is operable to load and execute a variety of software modules or other software components that are configured to perform the methods that are described below with reference to FIG. 4 and FIG. 6.

The processing apparatus 12 includes both a classifier training unit 26 for receiving training sets of image data and for training classifiers, and a landmark location unit 28 for locating a landmark in a set of image data using the classifiers.

Figure 4:
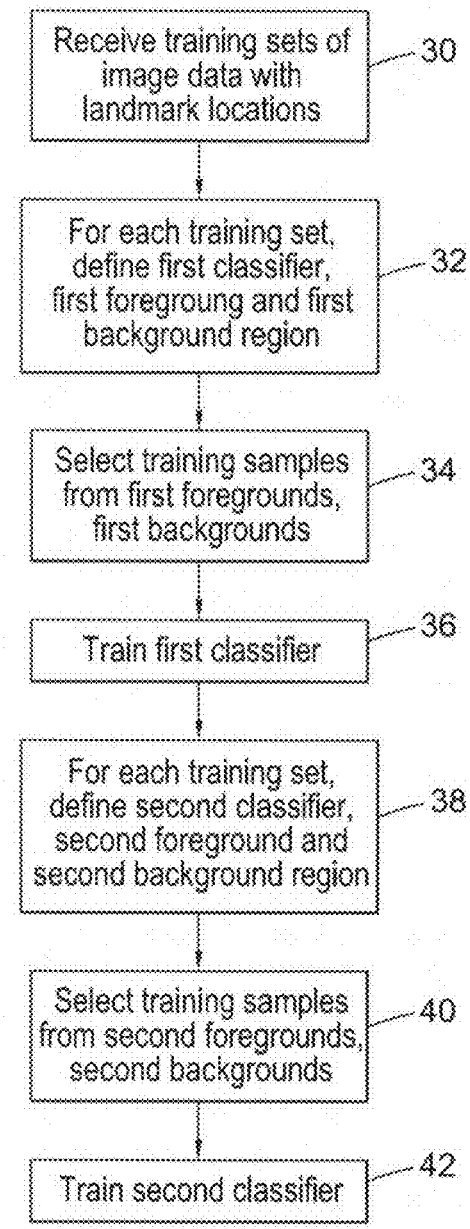
FIG. 4 is a flow chart illustrating in overview a mode of operation of the embodiment of FIG. 3, the mode of operation being a classifier training mode.
Figure 6:
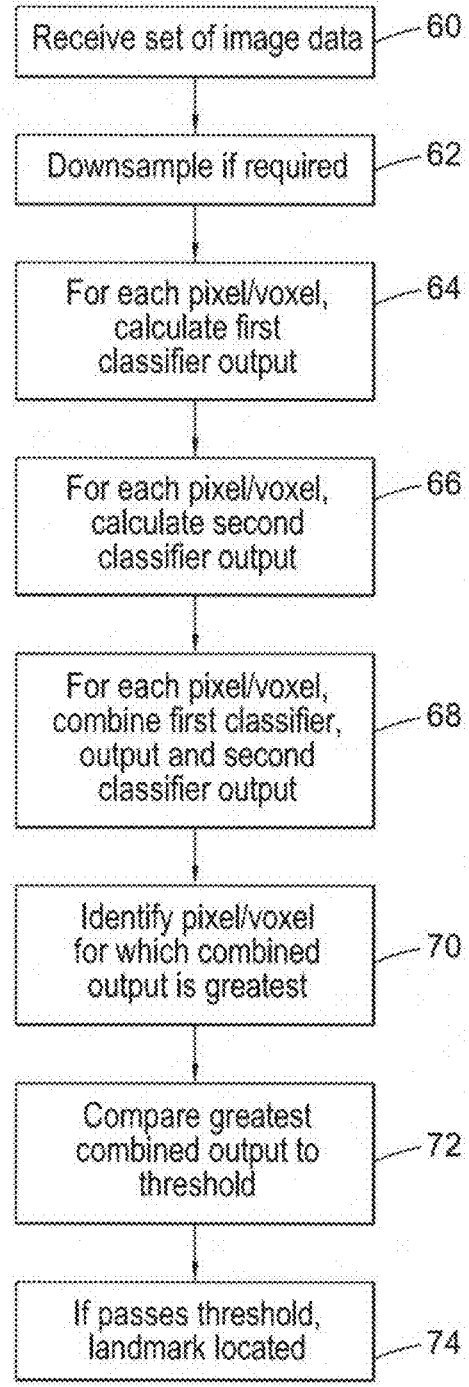
FIG. 6 is a flow chart illustrating in overview a mode of operation of the embodiment of FIG. 3, the mode of operation being a landmark detection mode.

The apparatus of FIG. 3 is configured both to perform a classifier training process having a series of stages as illustrated in overview in the flow chart of FIG. 4 based on sets of training data, and a subsequent landmark location process performed on further sets of image data and having a series of stages as illustrated in overview in the flow chart of FIG. 6. In alternative embodiments, a first apparatus is configured to perform the process of FIG. 4 to train the classifiers, and one or more second apparatuses are configured to perform the process of FIG. 6 to subsequently use the trained classifiers to classify further sets of image data. Thus, for example, classifiers may be trained initially by one computer based on training data sets, and the trained classifiers may be distributed to, and subsequently used by, various further computers (for example, workstations for use by radiologists or other operators, or central servers) to classify further image data sets.

In one embodiment, each of the first apparatus and the second apparatus is an apparatus as illustrated in FIG. 3. In an alternative embodiment, the first apparatus does not comprise a landmark location unit 28, and the second apparatus does not comprise a classifier training unit 26 or a CT scanner 14. In such an alternative embodiment, training and location are performed separately by different apparatus.

In the embodiment of FIG. 3, the classifier training unit 26 and landmark location unit 28 are each implemented in the processing apparatus 12 by means of a computer program having computer-readable instructions that are executable to perform the method of the embodiment. However, in other embodiments, each unit may be implemented in software, in hardware or in any suitable combination of hardware and software. In some embodiments, the various units may be implemented as one or more ASICs (application specific integrated circuits), GPUs (graphical processing units) or FPGAs (field programmable gate arrays) or any other pre-programmed or programmable logic devices.

The processing apparatus 12 also includes a hard drive and other components of a PC including RAM, ROM, a data bus, an operating system including various device drivers and hardware devices including a graphics card. Such components are not shown in FIG. 3 for clarity.

In the present embodiment, the classifier training unit 26 trains two nested classifiers to locate a specific landmark in a set of image data, where a set of image data is the data set corresponding to an image that has been obtained from the CT scanner, or other appropriate scanner. In further embodiments, a greater number of nested classifiers is used. The classifier training unit is able to train the classifiers on image data items, for example pixel, voxels or other points, from training sets of image data.

In the present embodiment, the landmark is a known anatomical landmark, for example the frontal horn of the right lateral ventricle. In further embodiments, the landmark may be any known anatomical landmark, or any other point that performs the same function of providing an identifiable point of interest or reference point.

The training process is outlined in the flow chart of FIG. 4. At stage 30, the classifier training unit 26 receives training sets of image data and associated ground truth landmark positions from the memory store 20. Each training set of image data is a set of image data that contains the landmark. The training process is described below in relation to two-dimensional image data, by way of example. However, three-dimensional image data may also be used as training sets of image data. Three-dimensional image data may be more likely to be used in practice than two-dimensional image data.

For each set of training data, the ground truth location of the landmark is known. In the present embodiment, the ground truth locations have previously been established, for example by manual identification by a clinician, and the ground truth locations have been stored in the memory store 20 along with their respective training sets of image data. It is expected that the ground truth position of the landmark may be different in different images, and that the images may also vary due to being from different patients or taken in different conditions. For example, the overall image intensities may vary.

In alternative embodiments, the classifier training unit 26 receives the training sets of data and associated ground truth positions from a remote data store. In further embodiments, the CT scanner 14 acquires training sets of data from a plurality of patients, and for each training set of data a clinician identifies the ground truth position of the landmark. In other embodiments an alternative method is used to identify the ground truth positions of the landmark. The alternative method may be manual, automated, or partially manual and partially automated.

In order for a classifier to be used in locating a landmark in an image, the classifier must be able to recognize which points in the image are parts of the background (regions that do not contain the landmark), and which points are part of the foreground (a region that does contain the landmark).

The term foreground may be used to refer to a region that contains a landmark, and the term background may be used to refer to a region that does not contain the landmark. In this context, the terms foreground and background do not necessarily imply anything concerning the image content of a particular region other than whether or not it contains the landmark. For example, depending on their boundaries, a background region or foreground region may contain regions of the subject's anatomy and/or regions of air and/or regions of table or other extraneous features, and are not limited to containing only image data representing a particular substance or feature.

In the present embodiment, the identification of points near the landmark is achieved by using a combination of two classifiers, which are trained as described below, rather than by using a single classifier. It is a significant feature of the embodiment that the second classifier is trained for locating the landmark to within a smaller foreground region than the first classifier.

At stage 32, the classifier training unit 26 determines a first classifier region 100 for each training set. In this embodiment, the first classifier region 100 is the entire image U. In other embodiments, the first classifier region 100 is defined to be the part of the image that represents the body of the patient, or a specified body compartment.

The process described below, for example the definition of regions and selection of training points, is described in relation to an image. However, it will be understood that in the present context references to processes being performed on an image may represent or comprise the processes being performed on image data representing the image. Thus, for example, reference to a particular region of an image being selected, would usually represent or comprise an equivalent subset of the set of image data being selected.

In the present embodiment, each set of image data is composed of pixels or voxels. The pixel or voxel size may be the pixel or voxel size resulting from the original CT (or alternative modality) scan. Alternatively, the pixel or voxel size may be a larger pixel or voxel size that results from downsampling of the original image.

The classifier training unit 26 partitions the first classifier region 100 of each training set into a first foreground region 102 and a first background region. This is shown in plot (c) of FIG. 5 for one training set of image data.

Classifier training unit 26 defines a region boundary, which in the present embodiment is a square C centered on the landmark $\lambda$ having sides of length $L_C$. The first foreground region 102, $\lambda^C$, is defined to be the region of the image that is contained within square C. In further embodiments, the region boundary is a rectangle, a circle or any other appropriate shape. The region boundary for both background and foreground regions will usually be determined relative to the position of the landmark, and the region may be centered around the landmark.

The classifier training unit 26 then defines the first background region to be the part of the first classifier region 100 that is not part of the first foreground region 102. In the present embodiment this is the part of the entire image U that is not contained in the region $\lambda^C$, and is denoted as $\lambda^{U/C}$, as shown in plot (c) of FIG. 5. In alternative embodiments, the classifier training unit 26 defines the first background region to be a part of the first classifier region 100 that is not part of the first foreground region 102, but leaves at least one point or region that is part of the classifier region but is neither part of the first foreground nor part of the first background.

At the end of stage 32, the classifier training unit has defined a first classifier region 100, first background region and first foreground region 102 for each of the training sets of image data. In this embodiment, the size of the square C that determines the first foreground region 102 is the same for each of the training sets of image data, and in each image the square C is centered on the respective landmark $\lambda$.

At stage 34, for each training set of image data, the classifier training unit 26 selects a plurality of first foreground training points, which may also be referred to as first foreground training samples or first foreground training pixels, from the first foreground region 102, $\lambda^C$. If the number of pixels in the first foreground region 102 is less than or equal to a threshold value, the classifier training unit 26 selects all of the pixels in the first foreground region 102 as first foreground training points. If the number of pixels in the first foreground region 102 is greater than the threshold value, the classifier training unit selects the plurality of first foreground training points using a sample selection method. In this embodiment, the sample selection method is Halton sampling with a fixed seed. In other embodiments, an alternative method of sample selection is used, for example another pseudorandom method of sampling. In this embodiment, each training point is an individual pixel. In alternative embodiments, each training point may be a group of pixels, or a downsampled pixel.

The classifier training unit 26 then selects a plurality of first background points from the first background region $\lambda^{U/C}$. If the number of pixels in the first background region is less than or equal to a second threshold, then every pixel in the first background region is selected. If the number of pixels in the first background region is greater than the second threshold, then the classifier training unit selects the plurality of first background training points using a selection method. In this embodiment, the selection method is the same method (Halton sampling) as for the first foreground region 102. In alternative embodiments, two different sampling methods may be used.

Figure 1:
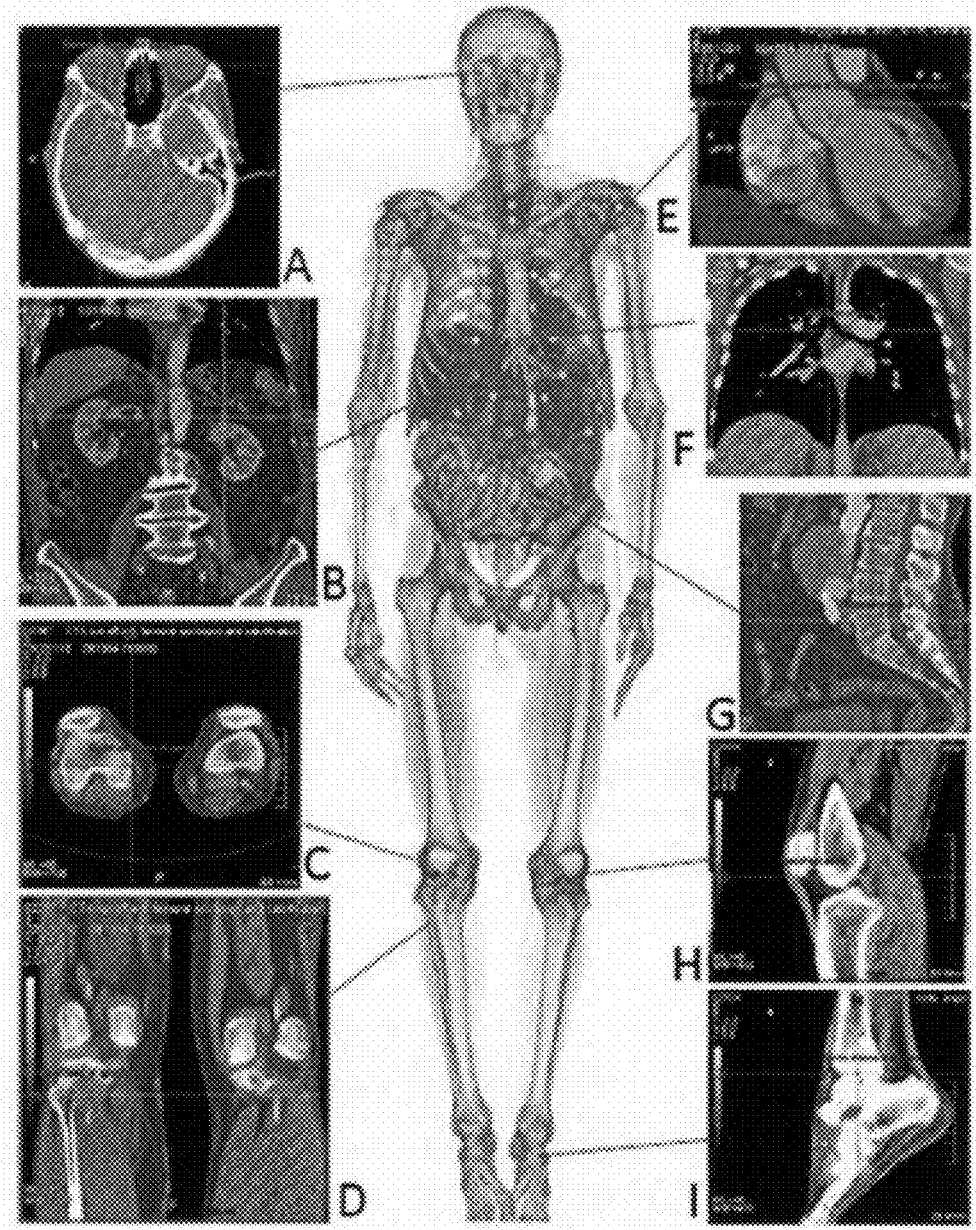
FIG. 1 is an illustration representing locations of anatomical landmarks.
Figure 2A:
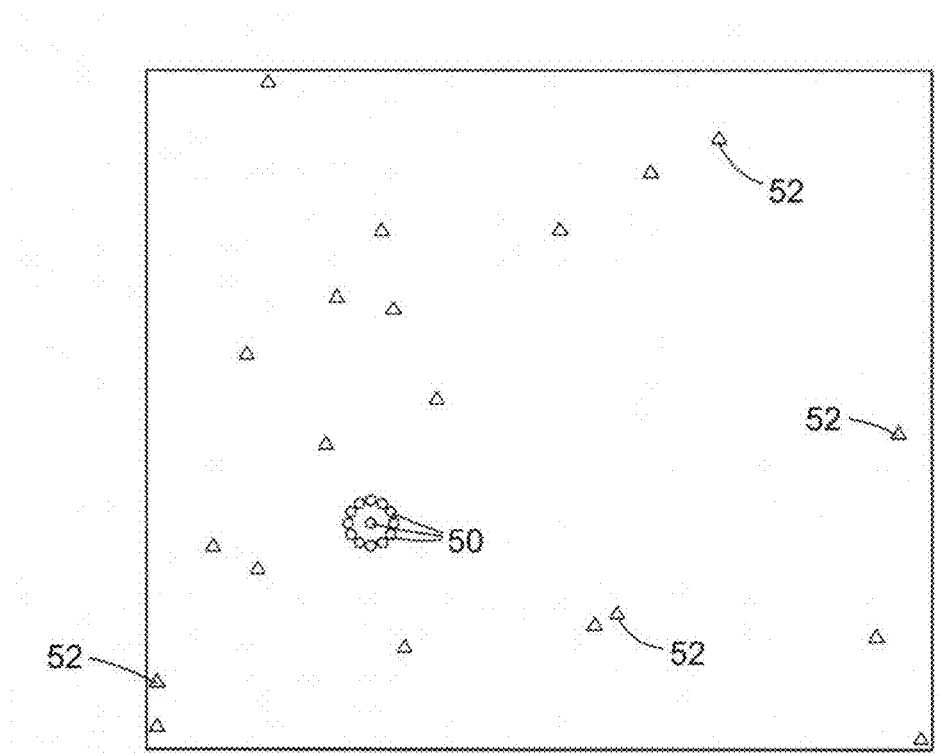
FIG. 2(a) is a schematic diagram representing sampling for a two-class classifier and FIG. 2(b) is a schematic diagram representing sampling for a multi-class classifier.
Figure 2B:
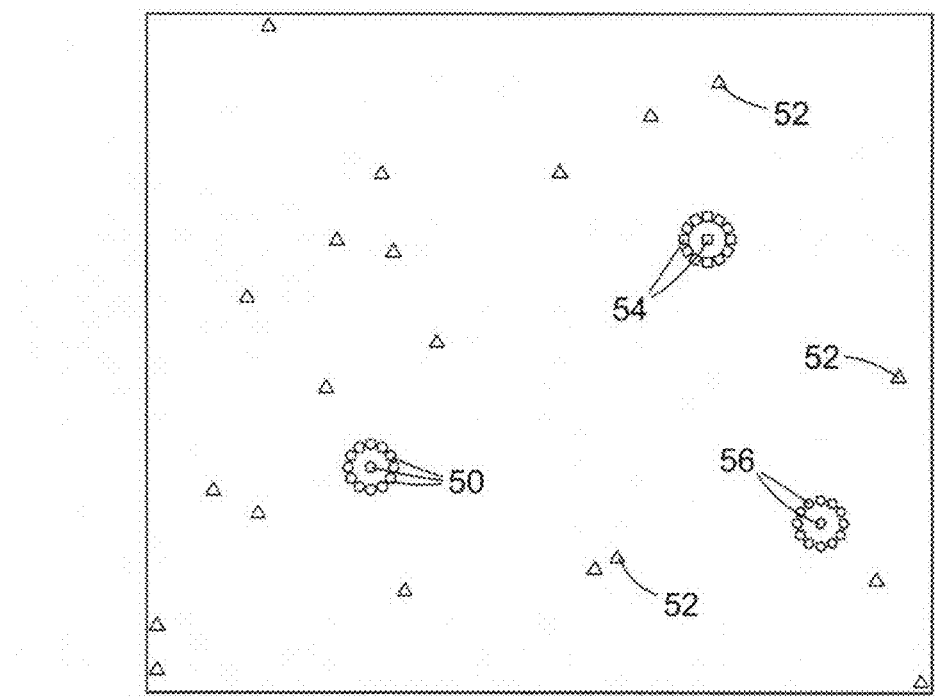

When using nesting classifiers, more than one step is used in locating the landmark. A first classifier may be used to distinguish between a foreground region and a background region, then a second classifier may be used which is trained on a narrower foreground region. As illustrated in plot (c) of FIG. 5, for the first classifier of the present embodiment, the difference in size between the first foreground region 102 and the first background region is not as great as for the scenario represented in FIG. 2(a). This is because the first classifier $C^C$ is designed only to locate the landmark within a substantial foreground region $\lambda^C$. A further classifier $C^B$ is then trained to locate the landmark within a smaller foreground area.

In the embodiment of FIG. 3, the number of training points is selected so that the number of background training points is twice the number of foreground training points. In other embodiments, a different relationship between the number of foreground training points and the number of background training points is used.

At stage 36, the classifier training unit 26 trains a first classifier $C^C$ to distinguish between a first class of points comprising foreground points and a second class of points comprising background points, using a training algorithm. In this embodiment, the classifier training unit 26 uses all of the first foreground training points and all of the first background training points for each of the training sets to train the classifier. In further embodiments, the classifier training unit trains the first classifier using a subset of the training points. In other embodiments, the classifier training unit trains the first classifier $C^C$ using training points from only some of the training sets of image data.

The classifier is trained by considering particular characteristics of the training points. The characteristics of the training points may be referred to as features, and such features for a particular training point may for example relate to a characteristic of the training point itself or to characteristics of the region surrounding the training point, for example characteristics of other training points in the region of the training point.

One example of feature of a training point is the intensity of the image at that point. Another is the average intensity of a defined region surrounding the point. Still another is the intensity of a further point that is at a given distance and angle from the point. Another is the intensity gradient, or other measure of variation of intensity or other property, at or near the training point in question. Features may also reflect the presence or absence of regions of a particular shape or size at or near the point in question. A feature does not have to measure a property only of the point in question, but may be a characteristic of another part of the image whose position is defined relative to the point in question. Any suitable characteristic of the point itself, or a region or points around the point, may be used as a feature of a particular training point in the classifier training process.

As part of the classifier training process, the classifier training unit 26 evaluates each of a plurality of image features for each of the foreground training points and each of the background training points. These image features may include intensity, gradient, texture or SURF features (Speeded Up Robust Features) at different locations relative to the point in question.

The classifier training unit 26 then uses a training algorithm to determine which of the evaluated features are the best features for distinguishing between points from the first foreground region 102, $\lambda^C$, and points from the first background region, $\lambda^{U/C}$. The most appropriate features are selected to form a feature vector for the classifier.

In this case, the first classifier $C^C$ is a decision forest. In alternative embodiments, the first classifier $C^C$ is any probabilistic two-class classifier, for example multivariate Gaussian, artificial neural network, support vector machine or k-nearest neighbor.

The processes of stages 32 to 36 described above are used to obtain a trained first classifier. Similar processes are then performed at stages 38 to 42 to obtain a trained, nested second classifier.

At stage 38, the classifier training unit 26 defines a second classifier region 102 for each training set of image data.

In the flow chart of FIG. 4 and in the present embodiment, stages 38 to 42 (definition of the second classifier region and training of the second classifier) occur after stages 32 to 36 (definition of the first classifier region and training of the first classifier). In alternative embodiments, the second classifier region may be defined before the definition of the first classifier region, simultaneously with the definition of the second classifier region, or at any other suitable time. The second classifier may be trained before the training of the first classifier, simultaneously with the training of the first classifier, or at any other suitable time.

Figure 5:
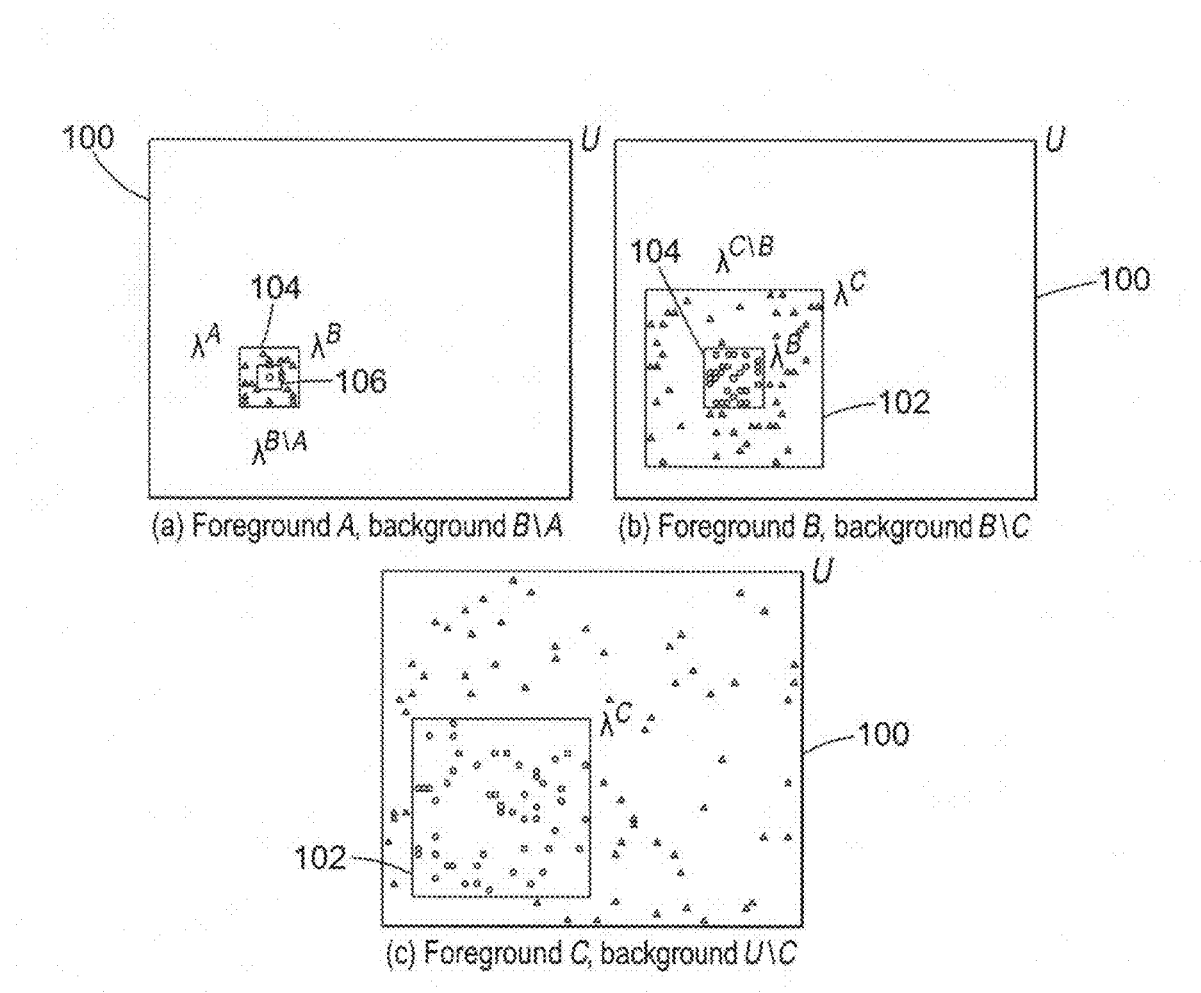
FIG. 5 is a schematic diagram representing foreground and background regions for a set of nested classifiers.

In the present embodiment, the classifier training unit 26 defines the second classifier region to be the first foreground region 102, $\lambda^C$, as illustrated in plot (b) of FIG. 5. The classifier training unit 26 then partitions the second classifier region 102 into a second foreground region 104 and a second background region. In this embodiment, the second foreground region 104, $\lambda^B$, is defined as the part of the image that is contained by a square B, which has sides of length $L_B$ and is centered on the landmark $\lambda$. The second background region $\lambda^{C\setminus B}$ is defined as the part of the image that is part of $\lambda^C$ but not part of $\lambda^B$. Therefore, the outer boundary of the second background region is substantially identical to the outer boundary of the first foreground region 102.

At stage 40, the classifier training unit 26 selects a plurality of second foreground points from the second foreground region 104 and a plurality of second background points from the second background region, using the same selection method and thresholds as in stage 34. In alternative embodiments, different thresholds for numbers of pixels are used. In other embodiments, a different selection method is used for the second foreground training points and the second background training points than was used for the first foreground training points and the first background training points. In the present embodiment, twice as many background training points as foreground training points are selected, as was the case for the training of the first classifier at stage 34.

At stage 42, the classifier training unit 26 trains a second classifier using training points from the second background regions and the second foreground regions 104 to train foreground and background classes. In this embodiment, the second classifier is a decision forest. In other embodiments, alternative classifiers are used. Features are evaluated for each of the second foreground training points and second background training points, and the classifier training unit 26 uses a training algorithm to select the best features for distinguishing between the second foreground and second background and to define a feature vector using the most appropriate features. In this embodiment, the features used by the second classifier are different from the features used by the first classifier. Therefore, the first and the second classifiers have different feature vectors. In other embodiments, the same features are used by the first classifier and by the second classifier.

Features that are evaluated for each point may comprise short- or long-range features (features that are close to the landmark, or further away from the landmark). Since first classifier $C^C$ covers the entirety of the image, in some embodiments first classifier $C^C$ may use more long-range features than second classifier $C^B$, which covers a more restricted region. First classifier $C^C$ may use large boxes and large offsets when evaluating features.

In some embodiments, the features used may extend outside of the classifier region. For example a feature used to train the second classifier may be a feature that is at a distance from the landmark such that the evaluated feature is in the first background region $\lambda^{U/C}$. If a fixed set of SURF features is used, the wavelet scale may be set appropriately to the level of the classifier (whether it covers the entire image or a subset of the image).

The process illustrated in the flow chart of FIG. 4 results in two nested classifiers, where the second foreground region 104 is nested inside the first foreground region 102 and where, in this embodiment, the foreground region of the first classifier is the classifier region of the second classifier.

The two nested classifiers $C^C$ and $C^B$ may be compared to a hypothetical single classifier for which the foreground region is $\lambda^B$ and the background region is everything in the image that is not in the foreground region, which may be written as $\lambda^{U \backslash B}$. In the case of the single classifier there would be a much greater difference in size between the foreground and background region than is the case for either the first classifier $C^C$ or the second classifier $C^B$ in this embodiment. In that case, either there would be many more background training points than foreground training points or much sparser sampling of the background region than of the foreground region. The single classifier would need to be trained to localize a landmark to a very small region in a single step, from a position of complete uncertainty (the landmark could be anywhere in the given data). This may be very difficult if the number of training points needs to be small, which is required in order to locate the landmark with precision.

Using two nested classifiers allows the requirement for similar numbers of background training points to foreground training points to be balanced with the requirement for a small foreground region in order to locate the landmark with precision. Nesting the classifiers, for example such that the first foreground region 102 is also used as the second classifier region 102, can enable the output of the classifiers to be combined in a meaningful manner when using the classifiers to locate a landmark.

The process of training the first and second classifiers, $C^C$ and second classifier $C^B$, has been described above in relation to FIG. 4. The process of using the classifiers to locate a landmark in an image data set will now be described.

The flow chart of FIG. 6 represents the process of locating a landmark using the first classifier $C^C$ and second classifier $C^B$ that were trained in the process of FIG. 4 as described above. The landmark location unit 28 uses the trained nested classifiers $C^C$ and $C^B$ to detect and locate a landmark within a set of image data for which the landmark position is not known.

In the present embodiment, the same apparatus (the apparatus of FIG. 3) that was used to train the classifiers is used to perform the landmark location. However, usually a different processing apparatus, for example a central server or the workstation of a radiologist or other operator, may be used to perform landmark location using pre-trained classifiers that have been provided by a different computer, for example a central processing resource, or distributed as part of a software product.

At stage 60, the landmark location unit receives a set of image data for which the location of the landmark is unknown. The landmark location unit also receives nested classifiers $C^C$ and $C^B$, in which the first classifier $C^C$ has been trained for landmark $\lambda$ on foreground $\lambda^C$ and background $\lambda^{U \backslash C}$ (as shown in plot (c) of FIG. 5) and the second classifier has been trained on landmark $\lambda$ on foreground $\lambda^B$ and background $\lambda^{C \backslash B}$ (as shown in plot (b) of FIG. 5), such that the second classifier region is the first foreground region 102. In this embodiment, landmark $\lambda$ is the frontal horn of the right lateral ventricle. In other embodiments, the landmark is any other anatomical landmark, point of interest, or reference point.

At stage 62, the landmark location unit downsamples the original image to 4 mm pixels. In other embodiments, the landmark location unit downsamples to a different pixel size. In an alternative embodiment, the landmark location unit does not downsample the image but uses the original pixels as obtained from the scan in which the image data was generated.

Each 4 mm pixel may be represented by a coordinate i. For clarity, and in order to de-emphasize scale and pixelization issues (or, equivalently, in the three-dimensional case, voxelization issues) the mathematical equations below are formulated as though the image is continuous. In the equations, i is used to signify a coordinate. The equations are formulated for continuous images, as if an image is a function $\Re^2 \rightarrow \Re$ and a landmark $\lambda$ is an exact point. In this case, i signifies a coordinate $i \in \Re^2$.

At stage 64, the landmark location unit 28 determines for each pixel in the image the output of the first classifier $C^C$. In this embodiment, the first classifier $C^C$ is a decision forest and the first classifier output is a class-conditional likelihood for the present landmark (the frontal horn of the right lateral ventricle) as determined by the first classifier $C^C$. This is the likelihood of the pixel being in the first foreground region 102, $\lambda^C$, given that the landmark is in the image U.

$x_i^C$ signifies a feature vector measured at i by the first classifier $C^C$. Feature vectors depend on image values in the (possibly large) neighborhood around i. The superscript $C$ recalls that in the present embodiment, the feature vector for the first classifier $C^C$ is different from the feature vector for the second classifier $C^B$. For brevity, the notation for the feature vector $x_i^C$ has dropped reference to the landmark $\lambda$, but it may be recalled that the each classifier and its associated feature vector is specifically trained for the present landmark (the frontal horn of the right lateral ventricle).

The first classifier $C^C$ may be considered to deliver either a likelihood ratio or an a posteriori probability. A likelihood ratio and an a posteriori probability are equivalent modulo a prior. The derivation below is for the first classifier $C^C$ but the derivation for the second classifier $C^B$ follows with appropriate substitutions $$C^C(i) \equiv Lik\left(\frac{C}{U}, i\right)$$
$$\equiv \frac{p(x_i^C \mid i \in \lambda^C)}{p(x_i^C \mid i \in U)}$$
$$= \frac{p(x_i^C \mid i \in \lambda^C)}{p(x_i^C \mid i \in \{\lambda^C \cup \lambda^{U \backslash C}\})}$$
$$= \frac{p(x_i^C \mid i \in \lambda^C)}{P(i \in \lambda^C \mid i \in U) \cdot p(x_i^C \mid i \in \lambda^C) + P(i \in \lambda^{U \backslash C} \mid i \in U) \cdot p(x_i^C \mid i \in \lambda^{U \backslash C})}$$

The two priors $P(i \in \lambda^C \mid i \in U)$ and $P(i \in \lambda^{U \backslash C} \mid i \in U)$ are easily obtained from the areas or volumes of the box C and image U.

$$P(i \in \lambda^C \mid i \in U) = \frac{|C|}{|U|}$$
$$P(i \in \lambda^{U \backslash C} \mid i \in U) = \frac{|U| - |C|}{|U|}$$

and of course these two priors sum to 1.

Finally, the a posteriori probability of the point i lying within the box C around the landmark is simply:

$$P(i \in \lambda^C \mid x_i^C, i \in U) = Lik\left(\frac{C}{U}, i\right) \cdot P(i \in \lambda^C \mid i \in U)$$

The classifier $C^C$ provides information about the probability of a point being within $\lambda^C$ providing that it is known that the point is within U. This may be described as obtaining a first classification of the point as foreground of background.

At stage 66, the landmark location unit 28 determines for each pixel in the image the output of the second classifier $C^B$.

In this embodiment the second classifier $C^B$ is a decision forest (a different decision forest from the first classifier) and the second classifier output is a class-conditional likelihood of the pixel being in the second foreground region, 104, $\lambda^B$ given that the landmark is in the second classifier region (first foreground region) 102, $\lambda^C$. This may be described as obtaining a second classification of the point as foreground or background.

$x_i^B$ signifies a feature vector measured at i by classifier $C^B$. In the present embodiment, feature vector $x_i^B$ is different from feature vector $x_i^C$.

Following the same derivation as for the first classifier $C^C$, the likelihood ratio $$Lik\left(\frac{B}{C}, i\right)$$

is defined by $$Lik\left(\frac{B}{C}, i\right) \equiv \frac{p(x_i^B \mid i \in \lambda^B)}{P(i \in \lambda^B \mid i \in \lambda^C) \cdot p(x_i^B \mid i \in \lambda^B) + P(i \in \lambda^{C\backslash B} \mid i \in \lambda^C) \cdot p(x_i^B \mid i \in \lambda^{C\backslash B})}$$

The priors are once again obtained from the areas of the boxes:

$$P(i \in \lambda^B \mid i \in \lambda^C) = \frac{|B|}{|C|}$$

$$P(i \in \lambda^{C\backslash B} \mid i \in \lambda^C) = \frac{|C| - |B|}{|C|}$$

and the a posteriori probability of the point i lying within the box B around the landmark is simply:

$$P(i \in \lambda^B \mid x_i^B, i \in \lambda^C) = Lik\left(\frac{B}{C}, i\right) \cdot P(i \in \lambda^B \mid i \in \lambda^C).$$

At stage 66, for each pixel in the image, the landmark location unit 28 combines the first classifier output and the second classifier output. In the present embodiment, the landmark location unit 28 combines the first classifier output and the second classifier output by taking a product of the class-conditional likelihoods at each pixel.

Each of the classifiers delivers a likelihood ratio or a posteriori probability relating to one level of the box nesting hierarchy. The first classifier $C^C$ provides information about the probability of a point being within box $\lambda^C$ providing that it is known that the point is within U. The second classifier $C^B$ provides information about the probability of a point being within box $\lambda^B$ providing that it is known that the point is within box $\lambda^C$. Therefore the first classifier $C^C$ and the second classifier $C^B$ can be combined to deliver the probability of a point being in $\lambda^B$ knowing only that the point is somewhere within U. In the above notation, it is necessary to obtain $$Lik\left(\frac{B}{U}, i\right).$$

This is obtained by combining $$Lik\left(\frac{C}{U}, i\right)$$

and $$Lik\left(\frac{B}{C}, i\right):$$

$$Lik\left(\frac{B}{U}, i\right) = Lik\left(\frac{B}{C}, i\right) \cdot Lik\left(\frac{C}{U}, i\right) \equiv C^B(i) \cdot C^C(i)$$

This is the product of the individual nested likelihood ratios defined above. Alternatively, one may write:

$$P(i \in \lambda^B \mid x_i^B, x_i^C, i \in U) = P(i \in \lambda^B \mid x_i^B, i \in \lambda^C) \cdot P(i \in \lambda^C \mid x_i^C \in U)$$

The relationships between likelihood ratios and probabilities above are dependent on the nested structure of the regions, where $\lambda^C$ is both the foreground region for the first classifier $C^C$ and the classifier region for the second classifier $C^B$. This enables the classifiers to be combined by a product of likelihoods. The output of stage 68 for each pixel may be described as a combined classification, a combined likelihood or a product likelihood.

At stage 70, the landmark location unit 28 determines which pixel in the image has the greatest product likelihood. This may be described as determining a maximum of the combined classification, or a maximum of the product likelihood. At stage 72, the landmark location unit 28 compares the greatest product likelihood to a detection threshold value. If the greatest product likelihood exceeds the detection threshold, then the landmark location unit 28 determines that the landmark has been found. At stage 74, the landmark location unit 28 delivers the location of the landmark, for example by adding a set of coordinates to a data file or displaying the landmark location on display screen 16.

If at stage 72, the greatest product likelihood does not exceed the detection threshold, then the landmark location unit 28 determines that the landmark is not present in the set of image data and does not add or display a set of coordinates.

In the present embodiment, the detection threshold is a fixed value that is stored within the landmark location unit 28. In an embodiment, the detection threshold is determined during the classifier training process by carrying out ROC (Receiver Operating Characteristic) analysis to plot the true positive rate against the false positive rate of each classifier or of the combined nested classifiers. In further embodiments, a differently derived threshold is used, or no detection threshold is used.

In an alternative embodiment, the combined classifier output is used to interpolate the position of the landmark to a finer resolution than the pixel resolution.

The processes of FIGS. 4 and 6 have been described in relation to two-dimensional images and pixels. However, the training and classification processes may also be performed on three-dimensional images and voxels in alternative embodiments or modes of operation.

Using nested classifiers to provide a combined classifier output, as described above with reference to FIG. 4 and to FIG. 6, decomposes the landmark location problem into a nested pair of classifiers, one global and one more local. The information in each classifier is combined in a probabilistically justified way by taking the product of the conditional probabilities.

By using nested classifiers, is not necessary to perform detection and location of a landmark in a single step, which requires a small foreground area to achieve precision but as a consequence may have difficulty in adequately representing the background in a small number of training points. Instead, the use of nested classifiers can enable the number of background training points to be kept fairly similar to the number of foreground training points (for example, between 0.5 times and 3 times the number of foreground training points). That may provide better training of the classifier. Using nested classifiers, the foreground region and background region for each classifier may be more similar in size than is the case for some known techniques. Coarse detection and precise location of the landmark may be provided within a single framework. There may be the potential to increase accuracy down to the limit of the image resolution.

The processes of FIG. 4 and of FIG. 6 may be implemented with any probabilistic two-class classifiers, for example multivariate Gaussian, k-nearest neighbor or support vector machine, or decision forest as described in the above embodiment.

By nesting the foreground and background region in the manner described above, the likelihoods may be easily combined by a single product.

In further embodiments, a third or further nested classifier is trained for locating the landmark in a set of image data. Using a third or further nested classifier allows the landmark to be located to within a narrower foreground while still maintaining a reasonable size relationship between foreground and background at each classifier stage. If the foreground and background regions continue to be nested such that the foreground region of one classifier is the classifier region of the next, the likelihoods of all the classifiers used may again be combined by a simple product.

In one embodiment, a third classifier $C^A$, is added to the processes of FIG. 4 and FIG. 6.

After stage 42 of FIG. 4, a third classifier region 104 is defined for each training set of image data. Each third classifier region 104 is nested inside its respective second classifier region 102. In this embodiment, the third classifier region 104 is the second foreground region 104, $\lambda^B$, as illustrated in plot (a) of FIG. 5.

A third foreground region 106, $\lambda^A$ is defined as the part of the third classifier region 104 that is inside a square A with sides of length $L_A$ centered on the landmark. A third background region $\lambda^{B\backslash A}$ is defined as the part of the third classifier region 104 that is not contained within A. Third foreground training points are selected from the third foreground region 106 and third background training points are selected from the third background region. All of the training points are used to train a third classifier. In an alternative embodiment, only some of the training points are used to train the third classifier.

The three nested classifiers $C^C$, $C^B$ and $C^A$ are then used in an extended version of the process of FIG. 6 to locate landmark A in a set of image data. After stage 66, the landmark location unit 28 calculates the output of the third classifier $C^A$ for each pixel. At stage 68, the landmark location unit 28 combines the first, second and third classifier outputs. In this embodiment, the landmark location unit 28 takes the product of likelihoods from the first, second and third classifiers to obtain the likelihood that landmark is in the third foreground region 106, $\lambda^A$, given that it is in the image U.

$$Lik\left(\frac{A}{U}, i\right) = Lik\left(\frac{A}{B}, i\right) \cdot Lik\left(\frac{B}{C}, i\right) \cdot Lik\left(\frac{C}{U}, i\right) \equiv C^A(i) \cdot C^B(i) \cdot C^C(i)$$

or equivalently, $$P(i \in \lambda^A | x_i^A, x_i^B, x_i^C, i \in U) = P(i \in \lambda^A | x_i^A, i \in \lambda^B) \cdot P(i \in \lambda^B | x_i^B, i \in \lambda^C) \cdot P(i \in \lambda^C | x_i^C, i \in U))$$

At stage 70, the landmark location unit 28 determines the pixel with the greatest value for the combined output (which is the product of likelihoods from the each of the three classifiers). At stage 72, the landmark location unit 28 compares the greatest combined likelihood to a threshold value. If it passes the threshold, the landmark location unit 28 determines the landmark location to be the location of the pixel with the greatest likelihood, and returns, stores or displays the landmark position.

Three nested classifiers may provide more precise location of the landmark than two nested classifiers. Nesting the classifiers such that the foreground region of one classifier is the classifier region of the next allows the likelihoods to be combined by taking a product.

As described, nested two-class classifiers may be trained to locate a single anatomical landmark (for example the frontal horn of the right lateral ventricle) in a set of image data. However, for many applications, for example registration, it is necessary to detect several anatomical landmark, or even all the landmarks in the human body.

In an embodiment, a plurality of instances of nested two-class classifiers are trained to locate a plurality of landmarks. Each combined classifier output is evaluated at each of the pixels or voxels of the image.

A classifier per landmark may require many trees, particularly in the decision forest approach. For example if there are 100 anatomical landmarks, three nested classifiers and 15 forest repeats, then taking number of trees=number of landmarks×number of classifier levels×number of forest repeats, the number of trees may be 100×3×15=4500. However, each of the trees may be small.

Using multiple two-class nested classifiers (one per landmark) rather than a multi-class classifier may provide a flexible architecture where landmarks may easily be switched in or out at detection time. Each of the nested classifiers is trained specifically to its respective landmark, providing both coarse detection and fine location of the landmark as a result of the nested classifier structure. Foreground and background training points may be selected for each classifier such that the heterogeneity of the background is adequately reflected. By using a nested classifier per landmark, it is possible to use different feature vectors for each landmark, as well as different feature vectors for each classifier within a given set of nested classifiers. Each nested classifier may be tailored to its landmark.

The embodiments described above refer to sets of image data that comprise two-dimensional image data. In other embodiments, the sets of image data comprise three-dimensional image data. In one such embodiment, three nested classifiers are trained, where the classifier, background and foreground regions of the three classifiers may be seen as a three-dimensional generalization of the regions of FIG. 5.

The first classifier region 100 is the entire image U. The first foreground region 102, or equivalently the second classifier region 102, $\lambda^C$, is contained by a cube C of sides $L_C$. The second foreground region 104, or equivalently the third classifier region 104, $\lambda^B$, is contained by a cube B of sides $L_B$. The third foreground region 106, $\lambda^A$ is contained by a cube A of sides $L_A$.

In alternative embodiments, the regions are not cubes but instead are cuboids, spheres or any other suitable three-dimensional shape.

Each background region may have much greater volume than its respective foreground region. For example, as drawn in FIG. 5 where the sides of the cubes triple at each level, the ratio of background to foreground volume is 26:1.

In the present three-dimensional embodiment, each training is downsampled to 3 mm voxels, that is, voxels each having a volume of $(3 \text{ mm})^3$. Cube A is defined as a cube of 3×3×3 voxels. The volume of cube A is $(9 \text{ mm})^3$. Cube B is defined as a cube of 9×9×9 voxels, $(27 \text{ mm})^3$. Cube C is a cube of 27×27×27 voxels, $(81 \text{ mm})^3$.

At stage 34, the classifier training unit 26 sets the foreground sample count to 50. This is also the threshold number of voxels in each of the foreground regions. If a foreground region has 50 or fewer voxels, all of the voxels in that foreground region are selected as foreground training points for that foreground region's classifier. If it has more than 50 voxels, Halton sampling is used.

The classifier training unit 26 sets the background sample count to be twice the foreground sample count, so 100 in this case. If a background region has 100 or fewer voxels, all of the voxels in that background region are selected as background training points. If it has more than 100 voxels, Halton sampling is used.

The training points are extracted for each training set of image data. Therefore if there are 20 training sets of image data, there may be 20(50+100)=3000 training points in total at each level, of which 1000 are foreground training points and 2000 are background training points.

Note however that the each foreground region is the part of the image that is contained within the appropriate cube, where the cube is centered on the landmark. If the landmark is situated near the edge of the image, then the cube may overlap the image edge and therefore the number of image voxels contained within the cube may be less than the overall cube size in voxels. This may be considered as intersecting the boxes with the dataset bounding box and padding, where the box U containing the entire image volume is the dataset bounding box without padding.

For each classifier, the number of background training points may be set to be in a similar range to the number of foreground training points. This may improve the performance of the classifier.

In the above embodiments, the combined classifier output is evaluated for every pixel in the (possibly downsampled) image, following the process of FIG. 6. In other embodiments, the landmark location unit 28 applies one or more of the nested classifiers to every pixel in the image, and then selects a region of the image to which to apply the remaining classifier or classifiers.

In some embodiments, the scale of pixels for which the classifier outputs are evaluated is changed between the calculation of the first classifier output and the calculation of a further classifier output.

In one embodiment, at stage 60 the landmark location unit 28 receives a set of image data with an initial pixel size of 1 mm and two classifiers $C^C$ and $C^B$ which are defined as above and as in plots (b) and (c) of FIG. 5. At stage 62, the landmark location unit 28 downsamples the image to a pixel size of 4 mm. At stage 64, the landmark location unit 28 calculates a first classifier output $C^C$ (i) for each of the downsampled (4 mm) voxels.

The landmark location unit 28 then uses the first classifier output for the downsampled pixels to determine a provisional position for the landmark λ. A provisional box region C' is applied to the image. In this embodiment, the provisional box region C' is centered on the pixel i that has the greatest value for the first classifier output $C^C$ (i). In other embodiments, the position of the provisional box region is determined by averaging the output at a number of pixels, by defining box C' to include all points that are identified as foreground points, or by any other suitable method.

In this embodiment, at stage 66 the second classifier output is evaluated only for pixels in the provisional box region. At stage 68, for each of the pixels in the provisional box region, a combined classifier output is evaluated by taking the product of the first classifier output and the second classifier output. At stage 70, the landmark location unit 28 determines which of the pixels in the provisional box region has the greatest value for the combined classifier output. At stage 72, a detection threshold is applied, and if the threshold is exceeded, the landmark location unit 28 determines the pixel with the greatest value of combined output to be the location of the landmark in stage 74. In an embodiment with three nested classifiers $C^C$, $C^B$ and $C^A$, it is possible to apply the derived expression for the likelihood ratio $$Lik\left(\frac{A}{U}, i\right)$$

(or the a posteriori probability) as the key indicator to search exhaustively over i within U in increments of 1 mm, to maximize this quantity. However, this would be costly. One might evaluate the same indicator sparsely, say every 10 mm, but this would have high frequency components due to the $$Lik\left(\frac{A}{B}, i\right)$$

term which may result in missing the correct peak. Thus for a coarse search it may be better to evaluate $$Lik\left(\frac{B}{U}, i\right),$$

that is, the product from classifiers $C^B$, $C^C$ only. This may also be more efficient.

Sampling scale and the regions over which each classifier is evaluated may be chosen to suit the particular problem and the resources available.

Additional information is now presented with regard to the effect of different classifier region sizes on the detection and location of an anatomical landmark. It is necessary to select an appropriate size of foreground when training each classifier to balance the precision to which the classifier may locate the landmark with the classifier's ability to represent the background.

Figure 7:
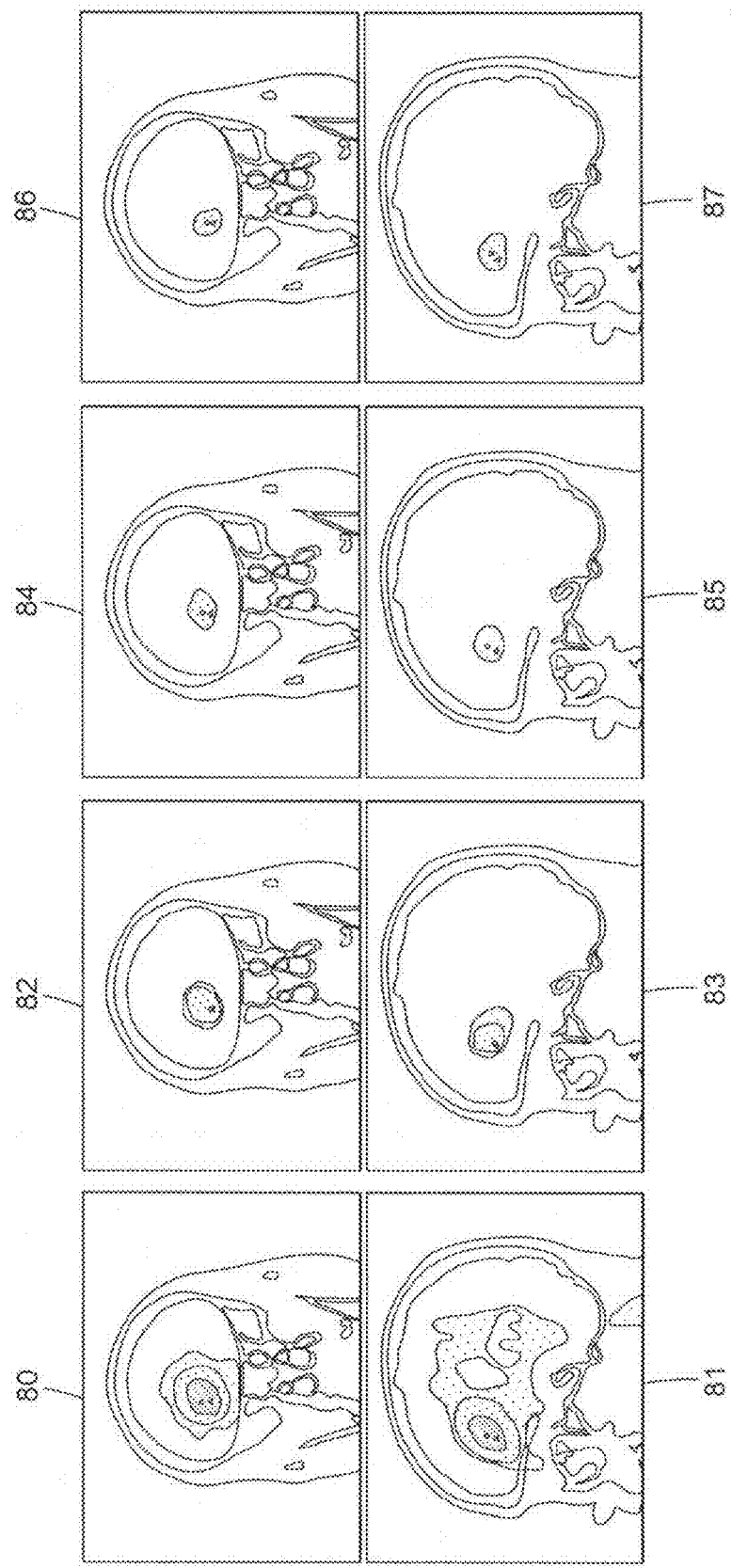
FIG. 7 comprises illustrations of the use of classifiers having different background regions.

FIG. 7 illustrates the effect of different classifier region sizes (and therefore different background region sizes) on the location of a landmark where the size of the foreground region is kept constant. For each of the images in FIG. 7, a single classifier has been used to locate the frontal horn of the right lateral ventricle. For the two scan views 80 and 81 the classifier used has been trained on a classifier region which is the whole image. For the two scan views 82 and 83, the classifier used has been trained on a classifier region of size 50 mm. For the two scan views 84 and 85, the classifier used has been trained on a classifier region of size 25 mm. For the two scan views 86 and 87, the classifier used has been trained on a classifier region of size 10 mm.

When the classifier region, and therefore the background region, is large (for example, scan views 80 and 81) the foreground peak is strong but broad. There is very little background noise. When the classifier region is small (for example, scan views 86 and 87) then the foreground peak is sharper but the background noise increases.

Figure 8A:
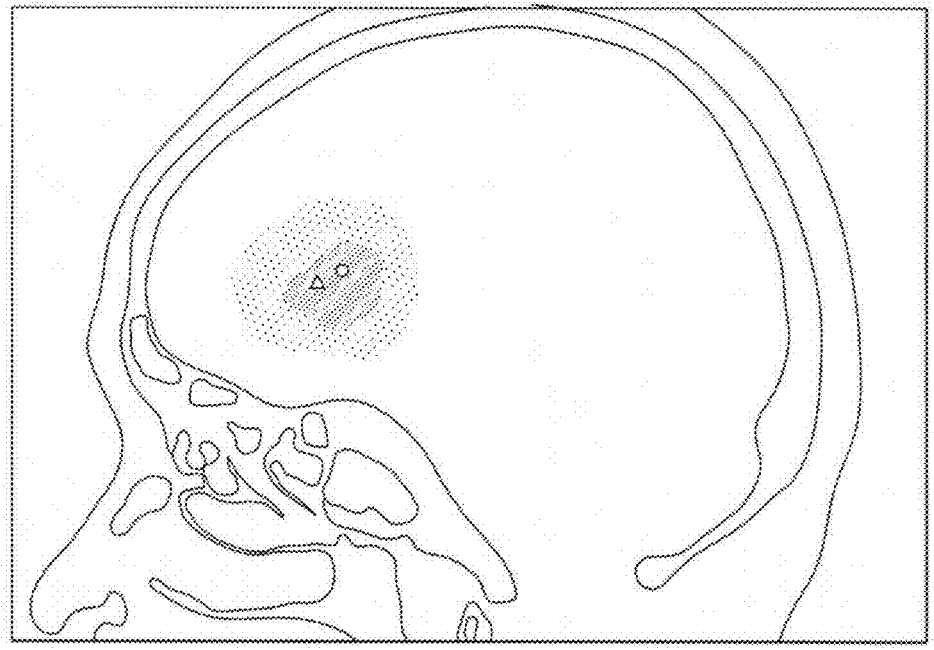
FIGS. 8(a) and 8(b) are illustrations of the use of classifiers having nested background and foreground regions.
Figure 8B:
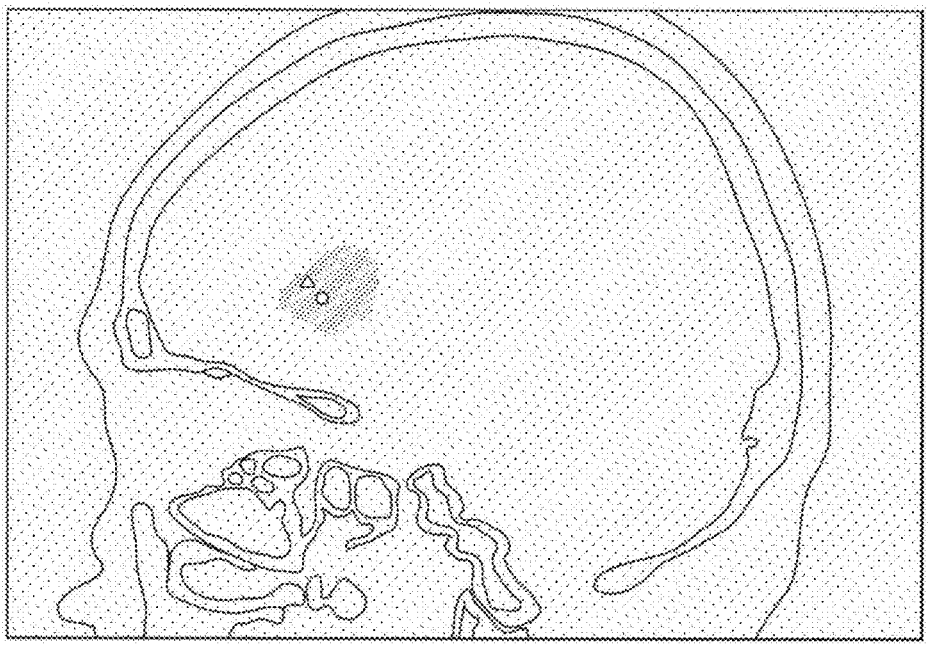

FIG. 8 shown results for two nesting classifier levels. In FIG. 8(a), the foreground region is 10 mm while the classifier region is 50 mm. This results in a broader peak and reduced background noise when compared with FIG. 8(b). For FIG. 8(b) the foreground region is 3 mm while the classifier region is 10 mm (equivalent to the foreground region of FIG. 8(a)). The peak is sharper than for FIG. 8(a) but the background noise is greater. It may be seen that combining these nested regions may combine the sharper peak with the reduced background noise. Coarse detection and precise location may be combined within a single framework, with potential to increase accuracy down to the limit of resolution or to ground truth accuracy.

The training process for the classifiers may be described in pseudocode. The following pseudocode, Algorithm 1, describes training three nested decision forest classifiers A, B and C for each landmark.

---
Algorithm 1 Training for all landmarks
---
Require: all datasets with ground-truth
    list $\{(\lambda, datasets)\}$ ← Count datasets for each landmark (all datasets with ground truth)
    min datasets ← 6
    Boxes A, B, C and U ← {See above for definitions}
    for $(\lambda, datasets) \in$ list do
        if count ≥ #min datasets then
            forestC ← Train forest for one level one landmark ($\lambda$, datasets, C, U)
            forestB ← Train forest for one level one landmark ($\lambda$, datasets, B, C)
            forestA ← Train forest for one level one landmark ($\lambda$, datasets, A, B)
        else
            print "Insufficient datasets with landmark $\lambda$"
        end if
        Save forestA, forestB and forestC in folder tree named for $\lambda$, A,B,C
    end for

---

Algorithm 1 then describes training one classifier (one level) for a single landmark.

---
Algorithm 2 Train forest for one level
one landmarks ($\lambda$, datasets, a, b)
---
Require: datasets with ground truth, each including landmark $\lambda$
Require: Inner and outer boxes a and b | a<b in all dimensions
    forest ← { }
    seed ← 42
    for i=0 to forest size do
        tree ← Train tree for one level one landmark ($\lambda$, datasets, a, b, seed)
        forest $\overset{+}{\leftarrow}$ tree
        seed ← Random (seed)
    end for
    return forest

---

Algorithm 3 describes training a single tree of the decision forest.

---
Algorithm 3 Train tree for one level one
landmark (($\lambda$, datasets, a, b, seed)
---
Require: datasets with ground truth, each including landmark $\lambda$
Require: Inner and outer boxes a and b | a<b in all dimensions
    foreground samples ← { }
    background samples ← { }
    for d $\in$ datasets do
        {In the following it is understood that $\lambda$ is the GT coordinate of landmark $\lambda$ in dataset d}
        foreground samples $\overset{+}{\leftarrow}$ Extract samples (d, $\lambda^a$, seed)
        background samples $\overset{+}{\leftarrow}$ Extract samples (d, $\lambda^{b\backslash a}$, seed)
    end for
    tree ← Train decision tree (foreground samples, background samples, seed)
    return tree

---

Classifiers may be trained and landmark or landmarks detected on any appropriate image data, for example CT, MR, ultrasound, PET or SPECT.

Although the training and subsequent use of the classifiers has been described in relation to particular points in image, for example represented by pixels or voxels, it will be understood that in alternative embodiments the classifiers can be trained on, or applied to, any suitable image data items, for example larger blocks of image data each representing a region larger than a single pixel or voxel.

It will be well understood by persons of ordinary skill of the art that embodiments may implement certain functionality by means of a computer program or computer programs having computer-readable instructions that are executable to perform the method of the embodiments. The computer program functionality could be implemented in hardware (for example by means of CPU). The embodiments may also be implemented by one or more ASICs (application specific integrated circuit) or by a mix of hardware or software.

Whilst particular units have been described herein, in alternative embodiments functionality of one or more of those units can be provided by a single unit, processing resource or other component, or functionality provided by a single unit can be provided by two or more units or other components in combination. Reference to a single unit encompasses multiple components providing the functionality of that unit, whether or not such components are remote from one another, and reference to multiple units encompasses a single component providing the functionality of those units.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An apparatus for locating a landmark in a set of image data, the apparatus comprising a landmark location unit that is configured, for each of a plurality of image data items, to obtain from a first two-class classifier a first classification of the image data item as foreground or background, to obtain from a second two-class classifier a second classification of the image data item as foreground or background, and to combine the first classification and the second classification to obtain a combined classification;

wherein the combined classification is obtained by taking the product of the first classification and second classification;

wherein the landmark location unit is further configured to use the combined classifications for the plurality of image data items having a maximum value of a product likelihood between the first classification and the second classification to determine a location for the landmark; and wherein the foreground region for the second classifier is inside the foreground region for the first classifier, such that the second classifier is trained for locating the landmark to within a smaller foreground region than the first classifier.

2. An apparatus according to claim 1, wherein each image data item comprises a point, pixel or voxel.

3. An apparatus according to claim 1, wherein a foreground region for the second two-class classifier is nested inside a foreground region for the first two-class classifier.

4. An apparatus for training classifiers for locating a landmark in a set of image data, comprising:—a classifier training unit configured to receive a plurality of training sets of image data and to train both a first two-class classifier and a second two-class classifier on the plurality of training sets, wherein:

each training set contains the landmark and for each training set the location of the landmark in the training set is known;

for each of the first and second classifiers, the classifier training unit is configured to train that classifier by determining a respective foreground region containing the landmark and a respective background region, and training the classifier to distinguish between image data items in the respective foreground region and image data items in the respective background region; and the foreground region for the second classifier is inside the foreground region for the first classifier, such that the second classifier is trained for locating the landmark to within a smaller foreground region than the first classifier using a maximum value of a product likelihood between first classifier and second classifier.

5. An apparatus according to claim 1, wherein each of the first two-class classifier and the second two-class classifier is a probabilistic classifier.

6. An apparatus according to claim 1, wherein each classification of a point as foreground or background comprises at least one of:

a probability or likelihood that the point is a foreground point;

a probability or likelihood that the point is a background point.

7. An apparatus according to claim 1, wherein the landmark location unit is configured to compare a value of the combined classification for at least one of the points to a threshold, and to accept or reject a landmark location in dependence on the comparison.

8. An apparatus according to claim 1, wherein the landmark location unit is further configured to select a region of the image data in which to obtain a second classification of points using the second classifier in dependence on the results of the first classification using the first classifier.

9. An apparatus according to claim 1, wherein the landmark location unit is further configured to obtain at least one further classification of each point as foreground and background, and, for each point, to combine the or each further classification with the first classification and the second classification to obtain the combined classification.

10. An apparatus for locating a landmark in a set of image data, the apparatus comprising a landmark location unit that is configured, for each of a plurality of image data items, to obtain from a first two-class classifier a first classification of the image data item as foreground or background, to obtain from a second two-class classifier a second classification of the image data item as foreground or background, and to combine the first classification and the second classification to obtain a combined classification;

wherein the landmark location unit is further configured to use the combined classifications for the plurality of image data items to determine a location for the landmark, and wherein each of the first two-class classifier and the second two-class classifier comprises a respective classifier trained by the apparatus of claim 4.

11. An apparatus according to claim 4, wherein each image data item comprises a point, pixel or voxel.

12. An apparatus according to claim 4, wherein the classifier training unit is configured to determine the background and foreground regions for each training data set such that the foreground region for the second classifier is nested within the foreground region for the first classifier.

13. An apparatus according to claim 4, wherein an outer boundary of the background region for the second classifier is substantially identical to an outer boundary of the foreground region for the first classifier.

14. An apparatus according to claim 4, wherein training each classifier comprises:

for each training set, selecting from the respective foreground region a plurality of foreground training image data items and selecting from the respective background region a plurality of background training image data items; and using the selected foreground training image data items and the selected background training image data items from the plurality of training sets to train the classifier to distinguish between a first class comprising foreground image data items and a second class comprising background image data items.

15. An apparatus according to claim 14, wherein, for each classifier, selecting a plurality of foreground training image data items and a plurality of background training image data items comprises at least one of:

selecting all pixels or voxels in the respective foreground region or the respective background region;

selecting pixels or voxels using a pseudorandom selection process;

selecting pixels or voxels using Halton sampling.

16. An apparatus according to claim 14, wherein training each classifier further comprises, for each foreground training image data item and for each background training image data item, evaluating each of a plurality of image features.

17. An apparatus according to claim 16, wherein each of the plurality of features comprises at least one of: an intensity, a gradient, a texture, a Speeded Up Robust Feature, a long-range feature.

18. An apparatus according to claim 16, wherein the plurality of image features evaluated to train the first two-class classifier are different to the plurality of image features evaluated to train the second two-class classifier.

19. An apparatus according to claim 4, wherein the classifier training unit is further configured to train at least one further two-class classifier, wherein the foreground region for the or each further classifier is nested within the foreground region for the second classifier.

20. An apparatus according to claim 4, wherein each of the first classifier and the second classifier comprises at least one of: a decision tree, a decision forest, multivariate Gaussian, artificial neural network, support vector machine, k nearest neighbor.

21. A method for training classifiers for locating a landmark in a set of image data, comprising:
- receiving a plurality of training sets of image data, wherein each training set contains the landmark and wherein for each training set the location of the landmark in the training set is known, and
- training a first two-class classifier and a second two-class classifier on the plurality of training sets;
- wherein training each classifier comprises determining a respective foreground region and a respective background region, and training the classifier to distinguish between image data items in the respective foreground region and image data items in the respective background region;
- and wherein the foreground region for the second two-class classifier is nested inside the foreground region for the first two-class classifier, such that the second two-class classifier is trained for locating the landmark to within a smaller foreground region than the first two-class classifier using a maximum value of a product likelihood between first classifier and second classifier.

22. A method for locating a landmark in a set of image data, comprising:
- for each of a plurality of image data items, obtaining from a first two-class classifier a first classification of the image data item as foreground or background, obtaining from a second two-class classifier a second classification of the image data item as foreground or background, and combining the first classification and the second classification item to obtain a combined classification of the image data item;
- obtaining the combined classification by taking the product of the first classification and second classification; and
- determining a location for the landmark in dependence on the combined classifications for the plurality of evaluation image data items having a maximum value of a product likelihood, wherein the foreground region for the second classifier is inside the foreground region for the first classifier, such that the second classifier is trained for locating the landmark to within a smaller foreground region than the first classifier.

* * * * *